N. L. OLSON.
SPRING SUSPENSION.
APPLICATION FILED APR. 14, 1916.
1,380,408.
Patented June 7, 1921
2 SHEETS—SHEET 1.
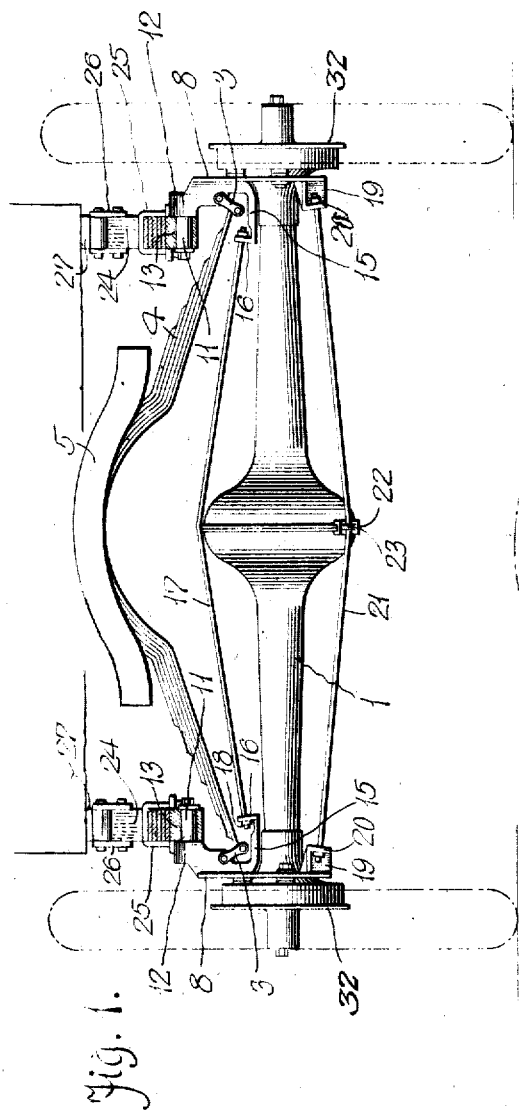
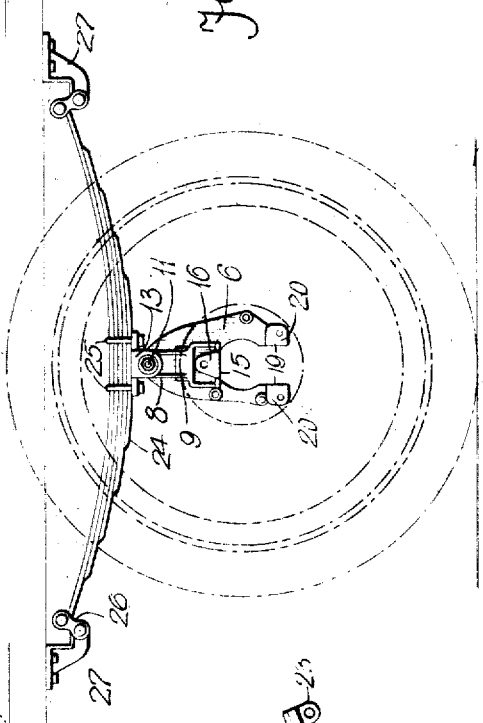
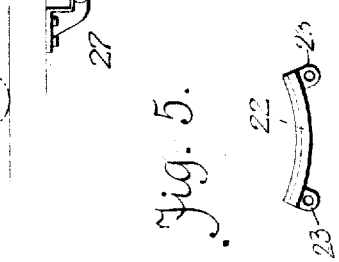
Witnesses
Chas. W. Stauffer
Anna M. Doe.
Inventor
Nels L. Olson,
By
Attorney N. L. OLSON.
SPRING SUSPENSION.
APPLICATION FILED APR. 14, 1916.
1,380,408.
Patented June 7, 1921
2 SHEETS—SHEET 2.
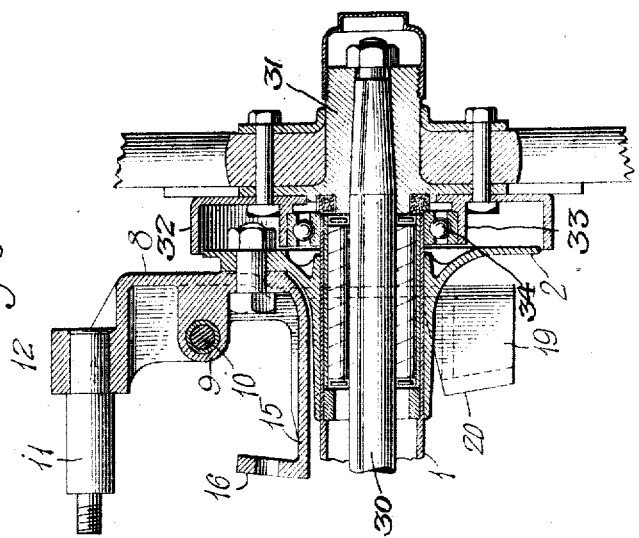
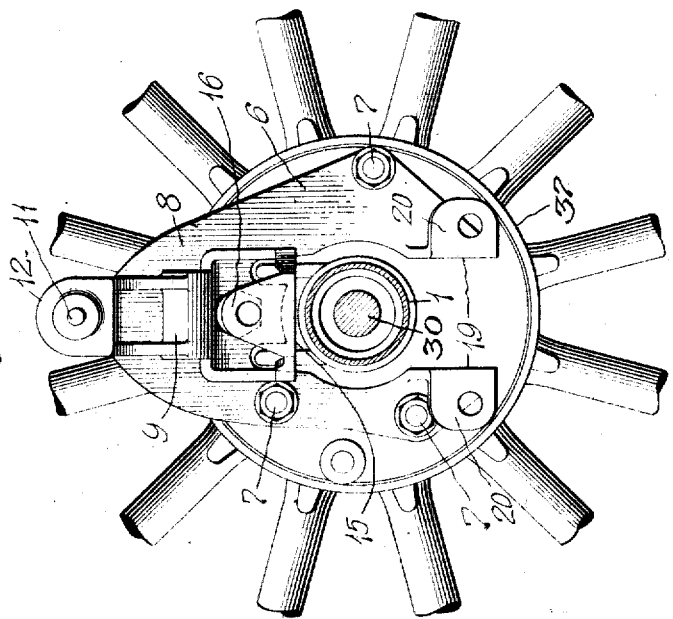
Witnesses
Chas. W. Stauffiger
Anna M. Dorr
Inventor
Nels L. Olson,
By
Attorneys

UNITED STATES PATENT OFFICE.

NELS L. OLSON, OF DETROIT, MICHIGAN.

SPRING SUSPENSION.

1,380,408.   Specification of Letters Patent.   Patented June 7, 1921.

Application filed April 14, 1916. Serial No. 90,996.

*To all whom it may concern:*

Be it known that I, NELS L. OLSON, a citizen of the United States of America, residing at Detroit, in the county of Wayne and State of Michigan, have invented certain new and useful Improvements in Spring Suspensions, of which the following is a specification, reference being had therein to the accompanying drawings.

This invention relates to means for suspending an auxiliary body on the rear drive axle of an automoblie of the type wherein a single spring that is parallel substantially to the rear axle carries the chassis in such manner that the axle readily bears the increased burden without danger of deformation there being no permanent change in the axle structure, which is always available for ordinary use when the auxiliary body and appurtenances are removed.

The invention consists in the matters hereinafter set forth, and more particularly pointed out in the appended claims.

In the drawings,

Figure 1 is a view in rear elevation of a rear axle and drive shaft equipped with devices that embody features of the invention;

Fig. 2 is a view in end elevation of the axle and applied parts;

Fig. 3 is a view in detail enlarged and in section, showing spring supporting means;

Fig. 4 is a view in end elevation of the parts shown in detail in Fig. 3; and

Fig. 5 is a view in detail of a truss rod.

Referring to the drawing 30 denotes an axle in a tubular casing or housing 1 and projecting therefrom. Fixed on the projecting end of the axle is a wheel hub 31 and the inner face of this wheel hub has a drum or member 32 and an annular flange 33. The flange 33 may be integral with the drum or member 32 or detachable relative thereto. The annular flange 33 surrounds the end of the axle casing or housing 1 and interposed between said casing and the flange 33 are bearings 34. It is through this arrangement of parts that the semi-floating axle structure is converted into a three-quarter-floating structure and this conversion constitutes a feature of my invention.

On the axle casing or housing 1 is a member or flange 2 provided with a shackle bracket from which a shackle 3 is hung in the usual manner to carry the end spring 4 on which the standard chassis 5 is mounted.

A bifurcated supporting member or plate 6 is formed to be secured against the inner face of the member 2 by holding bolts 7 or like securing means, the arms lying astride of the housing of the rear axle 1. peehspring perch bracket on the upper portion of this carrying member has an upright portion 8 from which extends a shackle bracket 9 that provides support for a shackle pivot 10 and the standard shackles 3 before referred to while an inwardly extending stud 11 on the upper portion or head 12 of the bracket affords supports for a spring block or perch 13. Below the extension 9, there is an inwardly extending arm 15 with upturned apertured lug 16 receiving the inner end of a truss rod 17 which extends over the rear housing into the companion fitting at the other end of the axle and acts thereby as an upper stay, there being take-up nuts 18 and check nuts if necessary or other means for imposing the necessary tension.

Each arm of the member 6 has at its lower end an inner extension 19, the extension having corresponding lugs 20 through which a pair of lower stay rods 21 extend to the companion fitting on the other end of the axle, being held in spaced relation at the middle of the housing 1 which constitutes the gear case, by a suitable spreader 22 having lugs 23 through which the brake rods extend.

Semi-elliptical springs 24 are each mounted on a spring perch 13 to which they are secured by the usual clips 25, the ends being carried by shackles 26 disposed in suitable hangers 27 that are secured to the lower or under side of the auxiliary body.

As a result of this construction, a support is obtained for an auxiliary body on a chassis of standard type which is primarily designed for road use in such a way as to carry an extremely heavy load directly to the axle and to permit the vehicle to be used as a truck.

Furthermore, this load is transferred to the axle at substantially the point of support in the bearing wheel journal, so that the additional strains are readily taken care of without the necessity of increasing or changing the axle dimensions, further than is herein shown, as by the addition of stay rods to take care of the slight increases in the strain of the side shock due to the added load.

Obviously, changes in the details of construction may be made without departing from the spirit of my invention and I do not care to limit myself to any particular form or arrangement of parts.

What I claim is:—

1. In an automobile having a rear axle provided with end flange members and a rear spring with suspending shackles, spring supporting members adapted to be secured astride the axle to the flange members and provided with shackle supports to which the shackles are secured, spring perch brackets on the supports, perches on the brackets, an auxiliary body and springs secured to the perches and shackled to the body.

2. The combination of the rear axle of an automobile provided with enlarged members at the extremities of the housing, a transverse spring and shackles for supporting the ends of the springs with bifurcated supporting members adapted to be secured over the axle against the enlarged end, shackle brackets thereon to which the shackles of the main spring are secured, a perch stud on the upper end of each supporting member, perches on the studs, an auxiliary body and springs on the perches shackled to the body.

3. The combination of a standard rear axle of an automobile having a stationary housing with enlarged end portions, a main spring and shackles for securing the spring with bifurcated supporting members secured astride the axle against the enlarged end portions and provided with stay rod lugs, rods adjustably connecting the companion lugs of the supporting members, a spreader for the stay rods bearing against the middle portion of the housing, perch brackets on the supporting members, studs extending therefrom, spring perches on the studs, springs clipped to the perches, an auxiliary body hung by shackles on the springs and shackle brackets on the supporting members to which the shackles of the main spring are pivoted.

4. The combination of the rear drive axle of an automobile having an exterior housing with enlarged end portions, with spring supporting members, each having a bifurcated body secured astride the housing against the enlarged portion thereof, a pair of depending inwardly extending stay rod lugs on each member, an upper stay rod lug on each member, an upwardly extending bracket on each member, a perch stud on each bracket and means for supporting a spring on the stud.

5. The combination of the main chassis, rear drive axle and transverse load spring between the axle and chassis in an automobile, the axle having a housing with enlarged end portions, of auxiliary spring support members each consisting of a bifurcated plate adapted to be detachably secured astride the axle against the enlarged end portion thereof, a shackle bracket on each plate, stay rod lugs on the plate, perch brackets on the plates, stay rods interconnecting the companion lugs and bearing against the housing at the central portion thereof, perch studs on the brackets, auxiliary springs secured by the studs, an auxiliary body and shackles supporting the body on the springs.

6. The combination of a rear drive axle having a stationary housing, a chassis, means for yieldingly supporting the chassis, and shackles for carrying the yielding means, with an auxiliary body, springs on which the body is hinged, means adapted to be secured detachably to the axle housing near the extremities thereof astride the axle provided with spring shackle supports and perches on the detachable means for the auxiliary body springs.

7. A spring structure for attachment to a vehicle having axle flanges, comprising a spring supporting yoke having a face portion arranged for attachment to an axle flange, a spring parallel to the yoke face portion, and means securing the spring to the yoke.

8. A spring structure for attachment to a vehicle having axle flanges, comprising a spring supporting yoke having a face portion for attachment to an axle flange and an upstanding portion carrying an extension outstanding at right angles thereto, a spring parallel to the yoke face portion, and means securing the spring to the outstanding portion of the spring supporting yoke.

9. The combination with a semi-boating axle structure including a casing, an axle journaled therein having a projecting end, and a wheel fixed to said projecting end, of means for converting it into a three-quarter-floating axle structure comprising a flange secured to the inner side of the wheel and surrounding the end of the casing and bearings interposed between said flange and said end of the casing.

In testimony whereof I affix my signature in presence of two witnesses.

NELS L. OLSON.

Witnesses:
ANNA M. DORR,
ESTHER M. BENSON.